(12) United States Patent
Cedergren et al.

(10) Patent No.: US 8,385,477 B2
(45) Date of Patent: Feb. 26, 2013

(54) DECISION BOUNDARY ESTIMATION FOR MIMO WIRELESS RECEIVERS

(75) Inventors: Andreas Cedergren, Bjärred (SE); Anders Rosenqvist, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 554 days.

(21) Appl. No.: 12/645,555

(22) Filed: Dec. 23, 2009

(65) Prior Publication Data

US 2011/0150059 A1 Jun. 23, 2011

(51) Int. Cl.
*H04L 27/06* (2006.01)
*H03D 1/00* (2006.01)

(52) U.S. Cl. ........ 375/340; 375/267; 375/316; 375/324; 375/347

(58) Field of Classification Search .................. 375/316, 375/324, 340, 267, 347
See application file for complete search history.

(56) References Cited

U.S. PATENT DOCUMENTS

| | | | |
|---|---|---|---|
| 7,154,966 B2 | 12/2006 | Malm et al. | |
| 7,668,226 B2* | 2/2010 | Cairns | 375/148 |
| 7,889,800 B2* | 2/2011 | Jonsson | 375/260 |
| 2008/0152053 A1 | 6/2008 | Fulghum et al. | |
| 2009/0213909 A1 | 8/2009 | Grant et al. | |
| 2009/0213910 A1 | 8/2009 | Grant | |

OTHER PUBLICATIONS

3rd Generation Partnership Project. 3GPP TS 25.101, V8.4.0(Sep. 2008). 3rd Generation Partnership Project; Technical Specification Group Radio Access Network; User Equipment (UE) radio transmission and reception (FDD) (Release 8).
3rd Generation Partnership Project. 3GPP TS 25.213, V8.4.0 (Mar. 2009). 3rd Generation Partnership Project; Technical Specification Group Radio Access Network; Spreading and modulation (FDD) (Release 8).
3rd Generation Partnership Project. 3GPP TS 25.214, V8.3.0 (Sep. 2008). 3rd Generation Partnership Project; Technical Specification Group Radio Access Network; Physical layer procedures (FDD) (Release 8).
Jonsson, E. et al. "Estimating the Ratio of Traffic Channel Power to Pilot Power in a MIMO Wireless Communication System." U.S. Appl. No. 12/391,796, filed Feb. 24, 2009.

* cited by examiner

*Primary Examiner* — Ted Wang
(74) *Attorney, Agent, or Firm* — Coats & Bennett, PLLC

(57) ABSTRACT

In a wireless receiver, an estimated decision boundary for use in detecting symbol values from one group of combined received symbols is calculated based on a estimated traffic-to-pilot channel scaling ratio or an estimated decision boundary corresponding to another group of combined received symbols. By properly combining the information derived from the latter group of combined received symbols with channel estimation information for the former group, a decision boundary estimate for the former group can be obtained without the use of amplitude or power information for the latter group of symbols.

16 Claims, 4 Drawing Sheets

DECISION BOUNDARY ESTIMATION FOR MIMO WIRELESS RECEIVERS

TECHNICAL FIELD

The present invention relates generally to wireless telecommunication systems, and relates in particular to methods and apparatus for processing multi-stream, multiple-input multiple-output signals in such systems.

BACKGROUND

The 3rd-generation (3G) Wideband Code-Division Multiple Access (W-CDMA) wireless networks specified by the 3rd-Generation Partnership Project (3GPP) include support for multiple-input multiple-output (MIMO) transmission techniques. (For details, see "3rd Generation Partnership Project; Technical Specification Group Radio Access Network; Physical layer procedures (FDD) (Release 8)," 3GPP TS 25.214, available at http://www.3gpp.org/ftp/Specs/html-info/25214.htm.) In systems built according to these standards, a 2×2 MIMO scheme may be used to transmit the High-Speed Downlink Shared Channel (HS-DSCH) over two transmit antennas via two distinct spatially multiplexed data streams. The two streams use the same channelization codes, but are separated from each other by orthogonal precoding weights.

In these systems, as well as in other systems where high-order modulation schemes such as 16QAM and 64QAM are used, a decision boundary needs to be computed for demodulating symbols from the received signal. The decision boundary is an estimate of the expected amplitude of the complex valued received data symbols, and is used to map (demodulate) received combined symbols to soft values or bits. Thus, for example, the decision boundary is used to map a combined symbol against the constellation map for 16QAM, to obtain 4 soft bit values corresponding to the combined symbol. In a 64QAM scheme, the decision boundary is used to map each received combined symbol to 6 soft bit values.

For MIMO systems, two or more parallel data streams can each use higher order modulation, in which case a separate decision boundary needs to be computed for each data stream. If a decision boundary is incorrect, demodulation and throughput performance of the corresponding data stream will suffer. Because the correct value of the decision boundary changes as the radio channel is fading, an estimate of the decision boundary needs to be recomputed from time to time, especially if the wireless receiver is moving. In conventional systems, a decision boundary for a given data stream is often computed by simply calculating an average over absolute values of several combined symbols of the data stream. In many receivers, an estimate of the decision boundary is computed once per transmission time slot, although other intervals are possible.

In a MIMO system, because of imperfections in the radio propagation channel between the transmitting base station and a mobile terminal, the two streams will interfere with each other. This interference is referred to as code reuse interference. For optimal performance, a MIMO receiver needs to suppress or cancel this interference. In addition to suppressing code reuse interference, a MIMO receiver also needs an estimate of the code reuse interference power to compute accurate channel quality reports for feeding back to the base station. If the receiver computes channel estimates based on pilot channel symbols (e.g., the W-CDMA Common Pilot Channel, or CPICH), the ratio of the traffic channel power (e.g., the W-CDMA High-Speed Physical Downlink Shared Channel, or HS-PDSCH) to the pilot channel power, per channelization code must be known or estimated. This per-code traffic-channel-to-pilot power ratio $\alpha_{PC}$ is used when suppressing or cancelling the code reuse term and may also be used to calculate an estimate of the received signal-to-interference-plus-noise ratio (SINR) for channel quality reporting.

One approach to suppressing code reuse interference in a Generalized Rake (G-Rake) receiver is described in U.S. Patent Application Publication No. 2008/0152053, titled "Method and Apparatus for Determining Combining Weights for MIMO Receivers" and published 26 Jun. 2008, the entire contents of which are incorporated by reference herein. With this approach, a receiver uses scaling parameters representing the normalized per-code energy allocated to each transmitted stream to calculate combining weights that suppress the cross-stream interference. These same scaling parameters may also be used to calculate the estimated code reuse interference power for the purposes of preparing channel quality reports.

Several techniques for estimating the per-code traffic-channel-to-pilot power ratio $\alpha_{PC}$ in a MIMO system are disclosed in several patent application publications, including U.S. Patent Application Publication No. 2009/0213910 and U.S. Patent Application Publication No. 2009/0213909, each of which corresponds to a patent application filed Feb. 25, 2008 and both of which are titled "Code Power Estimation for MIMO Signals." The entire contents of both of these publications are incorporated by reference herein. Notwithstanding the disclosures in these publications, improved techniques for estimating decision boundaries for use in detecting symbol values from a received signal are still needed.

SUMMARY

In several embodiments of the invention, an estimated decision boundary for use in detecting symbol values from one group of combined received symbols is calculated based on a estimated traffic-to-pilot channel scaling ratio or an estimated decision boundary corresponding to another group of combined received symbols. By properly combining the information derived from the latter group of combined received symbols with channel estimation information for the former group, a decision boundary estimate for the former group can be obtained without the use of amplitude or power information for that group of symbols.

In some embodiments, a first group of combined received symbols are formed from a first stream of a spatially multiplexed received signal, and a second group of combined received symbols are formed from a second stream of the spatially multiplexed received signal. In these embodiments, a decision boundary estimate or estimated traffic-to-pilot channel scaling ratio for the group of symbols from the first stream is combined with channel estimates corresponding to the group of symbols of the second stream to estimate a decision boundary for use in demodulating the symbols of the second stream. Because this estimated decision boundary for the second stream need not be based on amplitudes or power levels of the combined symbols from the stream, the estimate may be calculated before the combined symbols are formed. In a successive interference cancellation (SIC) receiver, for example, the estimated decision boundary for use in demodulating a slot of the second stream may be calculated after a corresponding slot of the first stream is demodulated, but before the combined symbols of the second stream, thus saving time and/or memory resources in the receiver.

Accordingly, embodiments of the present invention include a wireless receiver for detecting symbol values from a received signal, the wireless receiver comprising a signal processing circuit configured to calculate a first decision boundary estimate or a first estimate of a traffic-to-pilot channel scaling ratio, or both, for a first group of combined symbols, based on amplitudes or power levels of the combined symbols of the first group. The signal processing circuit is further configured to calculate a second decision boundary estimate corresponding to a second group of combined symbols, based on channel estimates corresponding to the second group and based on the first decision boundary estimate or the first estimate of the traffic-to-pilot channel scaling ratio, without using amplitudes or power levels of the combined symbols of the second group. Finally, the signal processing circuit is configured to detect a symbol value for each combined symbol of the second group, based on the second decision boundary estimate.

In some embodiments, the wireless receiver is configured with two or more antenna interfaces and a radio front-end circuit configured to provide received signal samples corresponding to each of the antenna interfaces. In these embodiments, the signal processing circuit may be configured to process received MIMO signals by forming the first group of combined symbols from a first stream of a spatially multiplexed signal, and forming the second group of combined symbols from a simultaneous second stream of the spatially multiplexed signal, using the received signal samples. In some of these embodiments, the signal processing circuit is configured to calculate the first decision boundary estimate by averaging the amplitudes of the first group of combined symbols, and to calculate the second decision boundary estimate directly from the first decision boundary estimate. In others, the signal processing circuit is configured to calculate the first decision boundary estimate by averaging the amplitudes of the first group of combined symbols, and to calculate the first estimate of the traffic-to-pilot channel scaling ratio based on the first decision boundary estimate and channel estimates for the first group of combined symbols. In these latter embodiments, the second decision boundary estimate is calculated from the first estimate of the traffic-to-pilot channel scaling ratio. In several embodiments, the first estimate of the traffic-to-pilot channel scaling ratio is based further on filtered prior estimates for the traffic-to-pilot channel scaling ratio.

In some embodiments of the invention that process MIMO signals, the signal processing circuit is further configured to detect first symbol values for the first group of combined signals, subtract a regenerated signal based on the first symbol values from the spatially multiplexed signal, to form an interference-reduced signal, and form the second group of combined symbols from the interference-reduced signal. Thus, the inventive techniques disclosed herein are readily applicable, although not limited, to successive-interference-cancellation receivers.

Similarly, although particularly applicable to MIMO receivers, the inventive techniques disclosed herein are not limited to MIMO applications. In some embodiments, the first and second groups of symbols may correspond to different time intervals on the same stream of a multi-stream signal, or at different time intervals of a signal that is not spatially multiplexed. In any of these embodiments, the signal processing circuit may in some cases be further configured to calculate a small-group estimate of the traffic-to-pilot channel scaling ratio, corresponding to the second group of signals, based on the second decision boundary estimate, and to generate an updated estimate of the traffic-to-pilot channel scaling ratio based on the small-group estimate.

Methods corresponding to the various receiver embodiments summarized above are also disclosed. Of course, those skilled in the art will appreciate that the present invention is not limited to the above features, advantages, contexts or examples, and will recognize additional features and advantages upon reading the following detailed description and upon viewing the accompanying drawings.

DETAILED DESCRIPTION

Several embodiments of the present invention are described herein with respect to MIMO operation in a W-CDMA network, which operation is more fully described below. However, the invention is not so limited, and the inventive concepts disclosed and claimed herein may be advantageously applied to a wide array of wireless systems, including, but not limited to, those exploiting spatial multiplexing for improved network capacity. Furthermore, the use of the term "exemplary" is used herein to mean "illustrative," or "serving as an example," and is not intended to imply that a particular embodiment is preferred over another or that a particular feature is essential to the present invention. Likewise, the terms "first" and "second," and similar terms, are used simply to distinguish one particular instance of an item or feature from another, and do not indicate a particular order or arrangement, unless the context clearly indicates otherwise.

Figure 1:
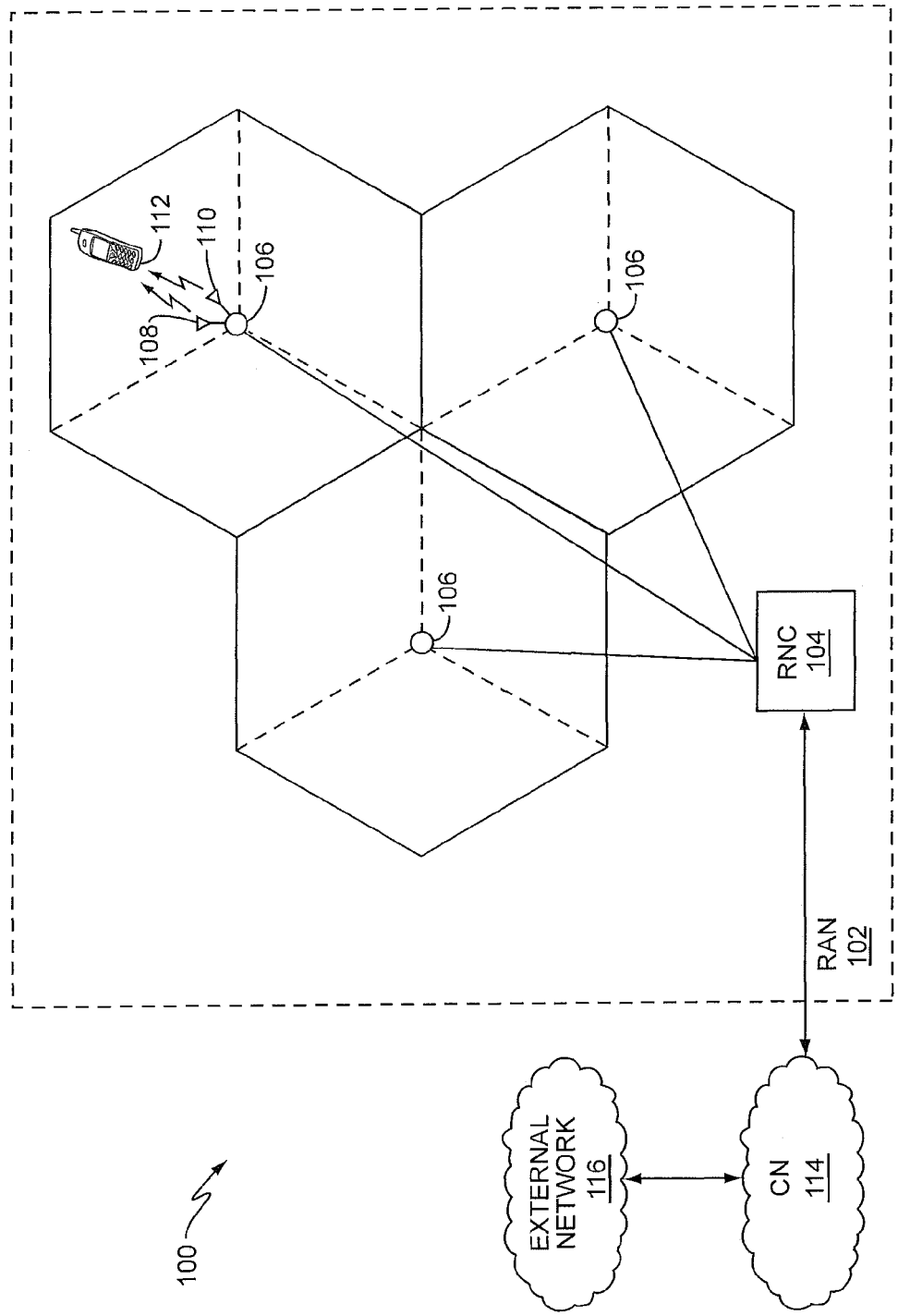
FIG. 1 is a functional block diagram of a wireless communication system.

FIG. 1 depicts an exemplary wireless communication system 100 employing multiple-input multiple-output (MIMO) transmissions, such as according to the 3GPP W-CDMA specifications. Within a Radio Access Network (RAN) 102, a Radio Network Controller (RNC) 104 controls a plurality of base transceiver stations (BTS) 106, also known in the art as Node B's. Each Node B 106 provides radio communication services with subscriber mobile terminals 112 within a geographic area called a cell, which may be divided into sectors, as depicted in FIG. 1. The RNC 104 communicates with a Core Network (CN) 114, which in turn is connected to one or more external networks 116, such as the Public Switched Telephone Network (PSTN), the Internet, or the like.

Figure 2:
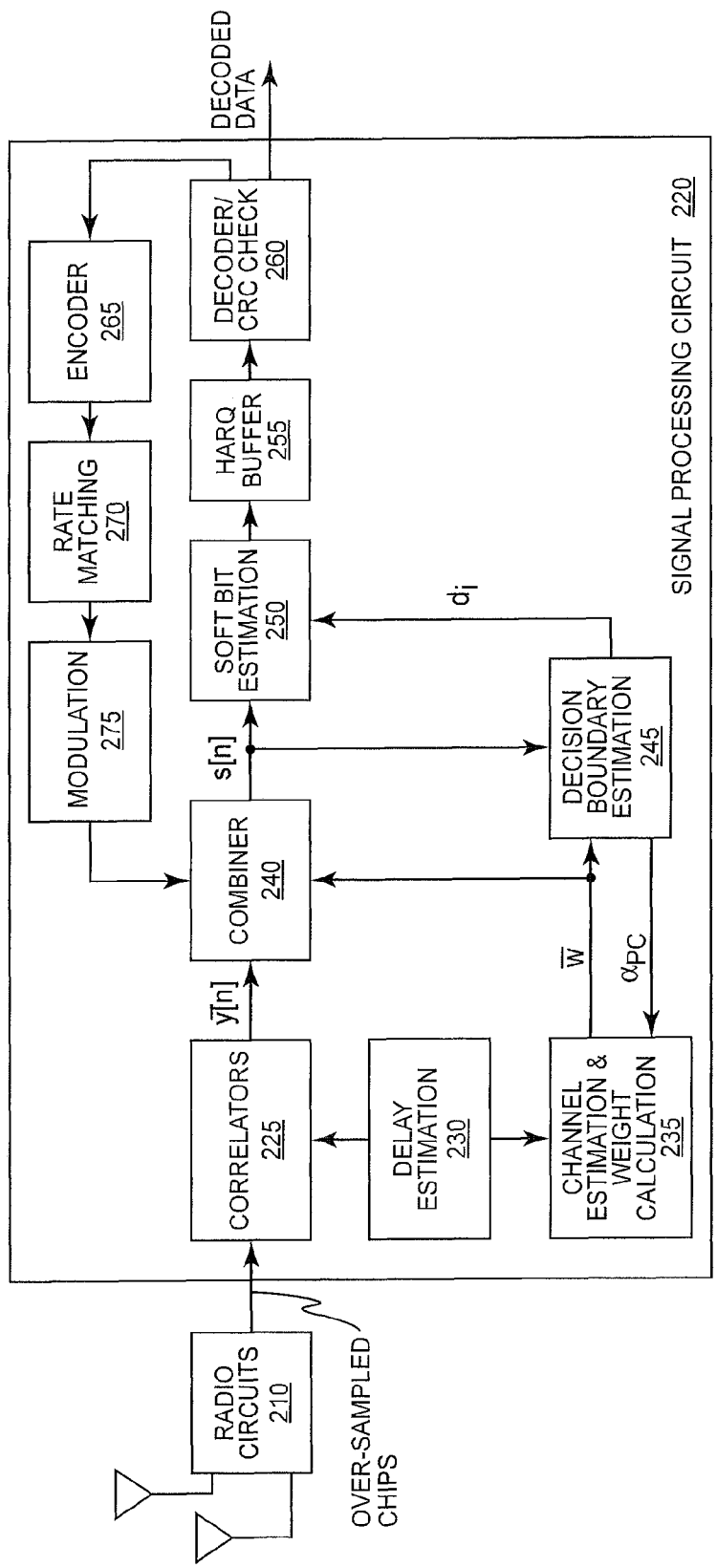
FIG. 2 is a functional block diagram of an exemplary wireless receiver configured to process received MIMO signals.

In the exemplary system 100 of FIG. 1, each base station 106 includes at least a primary transmit antenna 108 and a secondary transmit antenna 110 (either per-cell or per-sector, depending on the network 100 configuration), as shown in FIG. 2. The base station 106 may transmit an information signal, such as a precoded voice signal or a precoded High-Speed Downlink Packet Access (HSDPA) data signal, using both antennas 108 and 110. The signal transmitted on the secondary antenna 110 is weighted relative to the signal transmitted on the primary antenna 108, wherein the transmit weights may comprise phase offset only, or may more generally comprise a complex quantity having both phase and amplitude. The phase shift employed may be determined by feedback from the mobile terminal 112, thus forming a closed-loop transmit diversity system.

In a co-pending patent application titled "Receiver Parametric Covariance Estimation for Precoded MIMO Transmissions," published as U.S. Patent Application Publication No. 2009/0213944, the entire contents of which are incorporated by reference herein, a MIMO G-Rake receiver based upon the most general G-Rake formulation for MIMO is disclosed. For a 2×2 MIMO scenario, this receiver computes impairment covariance matrices corresponding to the first and second streams of a dual-stream precoded signal as:

$$R_{stream0} = R + \alpha_{PC}(1) h_{eff}(b_1) h_{eff}^H(b_1) \quad (1)$$

and $$R_{stream1} = R + \alpha_{PC}(0) h_{eff}(b_0) h_{eff}^H(b_0) \quad (2)$$

Here, R is that portion of the impairment covariance not including the code-reuse interference. In other words, R captures impairment covariance arising from inter-symbol interference (ISI), multiple access interference (MAI), and noise. The second term in each expression is the code-reuse interference term.

In Equations (1) and (2), the code-reuse interference term is a function of the effective net response corresponding to the interfering stream. For stream 0, for example, the interfering stream is stream 1, and the code-reuse term is a function of the effective net channel response $h_{eff}(b_1)$; for stream 1, the interfering stream is stream 0, and the code-reuse term is a function of $h_{eff}(b_0)$. The vectors $b_0$ and $b_1$ are the precoding vectors applied to streams 0 and 1, respectively.

More particularly, if n indexes data streams, then the effective net channel response vector corresponding to the $n^{th}$ stream is given by:

$$h_{eff}(b_n) = b_{0n} h_1 + b_{1n} \sqrt{\frac{\gamma_p(1)}{\gamma_p(2)}} h_2, \quad (3)$$

where $b_n = [b_{1n}\ b_{2n}]^T$ is the precoding vector applied to the $n^{th}$ data stream. The vector $h_m$ is the net channel response associated with the $m^{th}$ transmit antenna (m=1 or 2), and $\gamma_p(1)$ and $\gamma_p(2)$ denote the fraction of the total pilot power allocated to the first and second transmit antennas, respectively. Each element of the net response vector $h_m$ corresponds to a given Rake finger. For example, for finger f (associated with delay $d_f$ and receive antenna l), the corresponding net channel response vector element is given by:

$$h_m(f) = \sum_{p=0}^{P-1} g_m(p, l) R_{TX/RX}(d_f - \tau_p), \quad (4)$$

where P is the number of paths, $g_m(p,l)$ is the channel estimate (medium channel response) associated with transmit antenna m, receive antenna l and path delay $\tau_p$, and $R_{TX/RX}(\tau)$ represents the convolution of the transmit and receive pulse shaping filters.

In Equations (1) and (2), the code-reuse terms include a scaling factor, $\alpha_{PC}(n)$, representing the energy allocated to interfering stream n (for a given channelization, or "per-code"). Assuming uniform power distribution across channelization codes, the per-code energy for the $n^{th}$ stream is given by:

$$\alpha_{PC}(n) = \left(\frac{1}{\gamma_p(1) N_p}\right)\left(\frac{N_S}{K}\right) \gamma_d(n) \Gamma_{D/P}. \quad (5)$$

Here, K is the number of channelization codes used for each data stream (and is the same for each stream) and $\Gamma_{D/P}$ is the ratio of the power allocated to the data channel (in the W-CDMA specifications, the High-Speed Downlink Shared Channel, or HS-DSCH) to the total power allocated to the pilot channels (in W-CDMA, the Common Pilot Channel, or CPICH). The quantity $\gamma_d(n)$ denotes the fraction of the total data power allocated to the $n^{th}$ data stream, and $\gamma_p(1)$ denotes the fraction of the total pilot power allocated to the first transmit antenna. The quantities $N_s$, and $N_p$ represent the spreading factors used for the data channel (typically sixteen) and the pilot channel (typically 256), respectively.

Given the preceding construction, the per-code energies $\alpha_{PC}(0)$ and $\alpha_{PC}(1)$ are needed by a receiver to compute the stream-specific covariance matrices $R_{stream0}$ and $R_{stream1}$, which are in turn used to generate interference-suppressing combining weights. Typically, all of the quantities in Equation (5) are known to the receiver, with the possible exception of the data-to-pilot power ratio $\Gamma_{D/P}$. In the 3GPP W-CDMA specifications, a provision exists for explicit signaling of the data-to-pilot power ratio. In this case, a mobile station may simply obtain a value for $\Gamma_{D/P}$ via a downlink control channel, and compute the per-code energies $\alpha_{PC}(n)$ directly, using Equation (5). Another possible approach, where a value for $\Gamma_{D/P}$ cannot be obtained by signaling, is to simply use a pre-determined, nominal value for $\Gamma_{D/P}$. As noted above, other techniques for estimating the per-code traffic-to-pilot-channel power ratio $\alpha_{PC}$ in a MIMO system are disclosed in U.S. Patent Application Publication Nos. 2009/0213909 and. 2009/0213910, each of which has previously been incorporated by reference herein. both of which were filed Feb. 25, 2008 and both of which are titled "Code Power Estimation for MIMO Signals." Additional techniques for estimating $\alpha_{PC}$ are disclosed in co-pending U.S. patent application Ser. No. 12/391,796, filed Feb. 24, 2009 and titled "Estimating the Ratio of Traffic Channel Power to Pilot Power in a MIMO Wireless Communication System," the entire contents of which are hereby incorporated by reference herein.

As briefly discussed above, for higher order modulation schemes, such as 16QAM and 64QAM, a decision boundary needs to be computed for demodulating symbols; this decision boundary is used to map (demodulate) received combined symbols (e.g., the symbol values formed from the received signal using the interference-reducing combining weights discussed above) to soft values or bits, e.g. one 16QAM symbol maps to 4 soft bit values and a 64QAM symbol maps to 6 soft bit values. Inaccuracies in the decision boundary estimate will obviously affect the demodulation and decoding performance of the receiver, and throughput of the corresponding data stream will suffer. Furthermore, because the correct value of the decision boundary changes as the radio channel is fading, the decision boundary needs to be recomputed now and then, e.g., on a slot-by-slot basis. In a conventional approach a decision boundary for a data stream is estimated by simply taking averages over absolute values of combined symbols of the data stream.

One problem with the conventional approach is that the receiver needs to wait for the computation of combined symbols before the corresponding decision boundary can be estimated. The symbols cannot be demodulated until the decision boundary has been computed. This leads to a delay in the receiver and also creates a need for either temporarily storing the combined symbols or for re-calculating the combined symbols. Neither of these approaches is attractive, as the former drives up the requirements for high-speed memory, while the latter increases the computing resources needed. Furthermore, timing problems are exacerbated in the event that successive interference cancellation (SIC) techniques are used, since the demodulation of the second (and/or subsequent) data stream is already delayed due to the SIC receiver's sequential operation; additional delays needed to re-calculate combined symbols may be intolerable.

Another problem with the conventional approach that arises in some situations (including some scenarios not involving MIMO signals) is that the number of combined symbols available for estimation purposes may be so low that the decision boundary estimate is excessively noisy. This may be the case when there are few channelization codes in parallel use and/or when the radio channel is fading rapidly, giving a need for more than one decision boundary per slot.

In several embodiments of the present invention, a different approach is taken to estimating the decision boundary for use in demodulating at least some of the symbols in a received signals. The basic idea of this approach is to use additional information (in addition to the combined symbols of interest) and a known relation between this additional data and the decision boundary being sought to compute the decision boundary or an improved decision boundary. In particular, the additional information may be a traffic-to-pilot channel ratio, such as the per-code traffic-to-pilot channel scaling (power) ratio $\alpha_{pc}$ (described in more below) and/or another decision boundary estimate, i.e., a decision boundary estimate corresponding to a different group of symbols than those presently under consideration.

Although not limited to such use, this technique is particularly useful in demodulating MIMO symbols, where a first decision boundary estimate corresponding to one slot of a first data stream can be used to determine a second boundary estimate for the same slot of the second data stream, without requiring the use of power and/or amplitude information of the actual symbols in the second data stream. When used in a SIC receiver, this approach can help reduce excessive delays in the successive interference scheme, as the decision boundary estimate for the second stream to be processed may be generated without waiting for all of the combined symbols for the second stream to be formed.

FIG. 2 is a block diagram providing an overview of a wireless receiver configured to process signals according to one or more of the techniques disclosed herein. In particular, the receiver of FIG. 2 is configured to process two-by-two MIMO signals, using SIC. However, those skilled in the art will appreciate that the techniques described in reference to FIG. 2 are more generally applicable, and may be applied to receivers processing signals that are not spatially multiplexed, as well as to MIMO signals having even more spatial dimensions.

Generally speaking, signals received via two (or more) antenna interfaces are conditioned, downconverted, and digitally sampled by radio front-end circuits 210, which are configured to receive radio signals formatted according to one or more wireless communication standards such as the 3GPP standards for W-CDMA. Radio circuits 210 thus generate chip samples from the received signal, which includes the information signal transmitted from antennas 108 and 110 at base station 106, and provide the chip samples to signal processing circuit 220 for demodulation, detection, and further processing.

In the block diagram of FIG. 2, the details of signal processing circuit 220 are illustrated in terms of several functional blocks, include correlators 225, delay estimation circuit 230, channel estimation and weight calculation circuit 235, combiner 240, decision boundary estimation circuit 245, soft bit estimation circuit 250, HARQ buffer 255, and decoder/CRC check circuit 260. Signal processing circuit 220 further includes signal regeneration functionality for use in SIC, including encoder 265, rate matcher 270, and modulator 275. Of course, the functional block diagram of FIG. 2 is simplified; those skilled in the art will appreciate that a number of features and elements not necessary to a complete understanding of the present invention are omitted.

Figure 3:
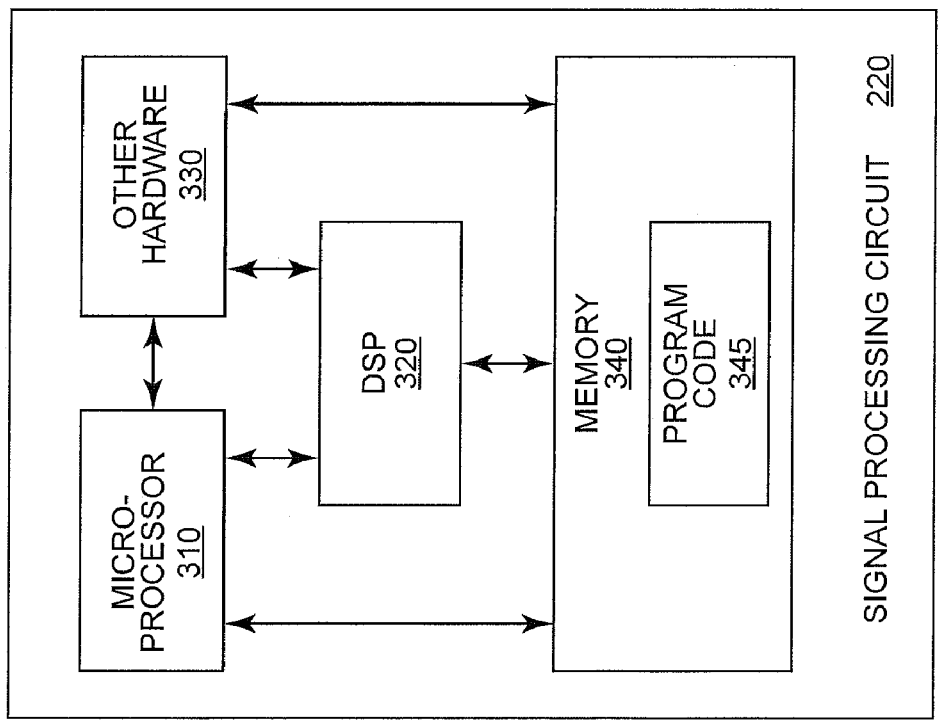
FIG. 3 illustrates exemplary baseband processing circuits for a wireless receiver.

Furthermore, those skilled in the art will appreciate that the functions illustrated in FIG. 2 may be implemented using a variety of programmable devices, digital hardware, or combinations thereof. FIG. 3 thus illustrates an exemplary implementation of signal processing circuit 220, in which signal processing circuit 220 comprise micro-processor circuits 310, digital-signal processing (DSP) circuits 320, and other digital hardware 330, each of which has access to memory 340. Memory 340 includes stored program code 345 containing instructions for carrying out one or more of the functions illustrated in FIG. 2; this stored program code is executed by at least microprocessor circuits 320.

Like FIG. 2, the schematic diagram of FIG. 3 is simplified; those skilled in the art will again appreciate that a number of features and elements not necessary to a complete understanding of the present invention are omitted. Those skilled in the art will thus appreciate that signal processing circuit 220 may, in various embodiments, comprise one or several microprocessors, microcontrollers, digital signal processors, and the like, each of which may be configured with appropriate software and/or firmware to carry out all or parts of the various functions illustrated in FIG. 2, and may further comprise various digital hardware blocks configured to carry out all or parts of those various signal processing tasks. Signal processing circuit 220 may be implemented with one or more application-specific integrated circuits (ASICs), off-the-shelf digital and analog hardware components, or some combination of ASICs and off-the-shelf hardware. Memory 340 may include several different types, including, but not limited to, flash, read-only memory (ROM), random-access memory (RAM), cache memory, etc., and may be implemented completely or partially on-board one or more ASICs, or using memory devices separate from the remaining circuits of signal processing circuit 220, or with some combination of these approaches.

Referring once again to FIG. 2, the over-sampled chip samples produced by radio circuits 210 are provided to signal processing circuit 220 for interference suppression, demodulation, and detection. In particular, the chip samples are fed to an array of correlators 225, typically called "fingers," where the samples are correlated with the channelization codes, or "de-spread," at each of several delays to produce a vector of de-spread values y[n] for each received symbol. The specific delays used by the correlators 225 are determined by the delay estimation circuit 230, and typically include delays corresponding to the strongest multipath "rays" in the received signal. The characteristics of the propagation channel between the transmit antennas and the receive antennas are measured by the channel estimation and weight calculation circuit 235, based on the finger delays and the received pilot symbols. The channel estimation & weight calculation circuit 235 also computes interference-suppressing combining weights, w, which are used in combiner 240 to combine the de-spread values y[n] in combiner 240 to produce combined symbol values, or "soft values" s[n], which are the receiver's estimates of the transmitted symbol values.

In a two-by-two MIMO system, two simultaneously transmitted streams use the same channelization codes, but are separated by orthogonal pre-coding weights. Due to imperfections in the propagation channel, the two streams will interfere with each other; this is referred to as code reuse interference. A MIMO receiver needs to suppress or cancel this interference. In one approach, a MIMO SIC receiver decodes first one stream; the stream is then regenerated for canceling the code reuse interference for the second stream.

In more detail, let the despread symbols out from the correlator block 225 (which may be, for example, an array of so-called RAKE fingers) in FIG. 2 be denoted as:

$$Y = Hb_0 s_0 + Hb_1 s_1 + U \quad (6)$$

where $b_i$ is the 2×1 pre coding weight vector, H is the N×2 channel matrix, where N is the number of delays/fingers, $s_i$ is the data symbol at a given instance for data stream i, and U is all other interference. For the purposes of this analysis, the symbol $s_i$ may be assumed to have normalized power set to 1.

The receiver computes weights (without rank-1 update) in the weighted channel estimator 235:

$$V_0 = \tilde{H} b_0 / R,$$

$$V_1 = \tilde{H} b_1 / R \quad (7)$$

where R is the covariance matrix. $\tilde{H}$ is the estimated channel matrix using pilot symbols (e.g., CPICH, in a W-CDMA system). Because pilot symbols are used to obtain $\tilde{H}$, $\tilde{H}$ must be multiplied with a channel scaling ratio reflecting the power ratio between the pilot channel and the traffic channel to get the same magnitude of the traffic channel response H. Thus, it must be multiplied with the per-code traffic-to-pilot channel scaling (amplitude) ratio $\sqrt{\alpha_{PC}}$.

To account for code-reuse interference to the first stream, the receiver does a rank-1 update of the combining weight vectors used to form combined symbol values for the first stream (also computed in the weighted channel estimation block 235 in FIG. 2):

$$W_0 = V_0 - \frac{\alpha_{pc} V_1^H \tilde{H} b_0}{1 + \alpha_{pc} V_1^H \tilde{H} b_1} V_1. \quad (8)$$

As discussed above, the traffic-to-pilot channel scaling ratio $\alpha_{pc}$ compensates for using pilot symbols to estimate the channel. The received combined symbol computed in the combiner block 240, given that the rank-updated weights of Eq. (8) are used, can then be written as:

$$\tilde{s}_0 = W_0^H Y \quad (9)$$

FIG. 2 also includes a decision boundary estimation circuit 245 for calculating the decision boundary estimate $d_i$ to be used in the soft bit value estimator 250. The resulting soft bit values are fed to a HARQ block 255 and decoder/CRC checker 260. If the CRC checks (indicating that the bits were successfully decoded), the decoded signal is re-encoded, rate matched, interleaved and modulated, to produce a regenerated version of the symbols of the first data stream. In the receiver of FIG. 2, these operations take place in the encoder 265, HARQ rate matcher 270, and modulator 275. The regenerated symbols of the first stream may then be subtracted from the original received signal to produce an interference-reduced signal; i.e., a signal with at least some of the code-reuse interference caused by the first stream removed. If the regenerated symbol $s_0$ has a normalized power set to 1, then the regenerated symbols may then be used to produce the combined symbol values for the second stream according to:

$$\tilde{s}_1 = V_1^H Y - \sqrt{\alpha_{PC}} V_1^H \tilde{H} b_0 s_0 \quad (10)$$

Once more, the traffic-to-pilot channel scaling ratio $\alpha_{pc}$ compensates for using pilot symbols to estimate the channel.

If the CRC check fails, then SIC is not used for the corresponding slot. Instead, a rank-one update is also performed to obtain combining weights for the second stream:

$$\tilde{s}_1 = W_1^H Y, \quad (11)$$

where $$W_1 = V_1 - \frac{\alpha_{pc} V_0^H \tilde{H} b_1}{1 + \alpha_{pc} V_0^H \tilde{H} b_0} V_0, \quad (12)$$

and the combined symbol values for the second stream obtained according to:

$$\tilde{s}_1 = W_1^H Y \quad (13)$$

A decision boundary estimate for demodulating the symbols of the first stream is formed by averaging the absolute mean value of combined symbols. Thus:

$$d_0 = \frac{1}{2N} \sum_{n=0}^{N-1} |\text{Re } \tilde{s}_{0,n}| + |\text{Im} \tilde{s}_{0,n}|, \quad (14)$$

where N is the number of HS-PDSH symbols. The decision boundary estimate is then used to de-map symbols of higher order modulation, such as 16QAM and 64 QAM, at soft bit estimation circuit 250.

Those skilled in the art will appreciate that $\alpha_{pc}$ can be estimated from the decision boundary from stream 0 as:

$$\alpha_{pc} \approx \left( m_0 \cdot \frac{2 d_0}{|\text{Re}(W_0^H H b_0)| + |\text{Im}(W_0^H H b_0)|} \right)^2, \quad (15)$$

where m depends on the modulation scheme (for QPSK, m=1, for 16QAM, m=$\sqrt{5/4}$, and for 64 QAM, m=$\sqrt{21/16}$. The factor m compensates for the fact that absolute values are used instead of power estimates to compute the power ratio. Of course, as discussed in the several patent applications mentioned above and incorporated by reference herein, there are also other methods for estimate $\alpha_{pc}$.

Next, methods of estimating the decision boundary, using decision boundary estimation circuit 245, are presented. In some embodiments of the invention, the fact that $\alpha_{pc}$ is the same for both streams of a MIMO signal is exploited. If SIC has been used to remove the effects of the first stream from the combined symbol values for the second stream, then $\alpha_{pc}$ can be related to the decision boundary for the second stream and the combining weight values for the second stream (without rank-one updating) as follows:

$$\alpha_{pc} \approx \left( m_1 \cdot \frac{2d_1}{|\text{Re}(V_1^H H b_1)| + |\text{Im}(V_1^H H b_1)|} \right)^2. \quad (16)$$

Thus, the decision boundary for the second stream can be estimated by calculating:

$$d_1 = \frac{|\text{Re}(V_1^H H b_1)| + |\text{Im}(V_1^H H b_1)|}{2m_1} \sqrt{\alpha_{pc}}. \quad (17)$$

In this approach the "additional information" used to estimate the second decision boundary estimate is the traffic-to-pilot channel scaling ratio $\alpha_{pc}$. Those skilled in the art will also appreciate that the decision boundary estimate of Eq. (17) is calculated without the use of power and/or amplitude information for the combined symbols of the second data stream.

Instead of using the traffic-to-pilot channel scaling ratio, the decision boundary for the first stream may be used directly:

$$d_1 = \frac{m_0 |\text{Re}(V_1^H H b_1)| + |\text{Im}(V_1^H H b_1)|}{m_1 |\text{Re}(W_0^H H b_0)| + |\text{Im}(W_0^H H b_0)|} d_0. \quad (18)$$

In this approach, the "additional information" used to estimate the second decision boundary is the decision boundary estimate for the first stream, $d_0$.

In a similar way the decision boundary can, if the CRC for the first stream fails, be estimated by:

$$d_1 = \frac{|\text{Re}(W_1^H H b_1)| + |\text{Im}(W_1^H H b_1)|}{2m_1} \sqrt{\alpha_{pc}}. \quad (19)$$

In either case, the decision boundary estimate for the second stream can be computed without the use of combined symbol values for the second stream, thus saving time and/or conserving processing resources.

Figure 4:
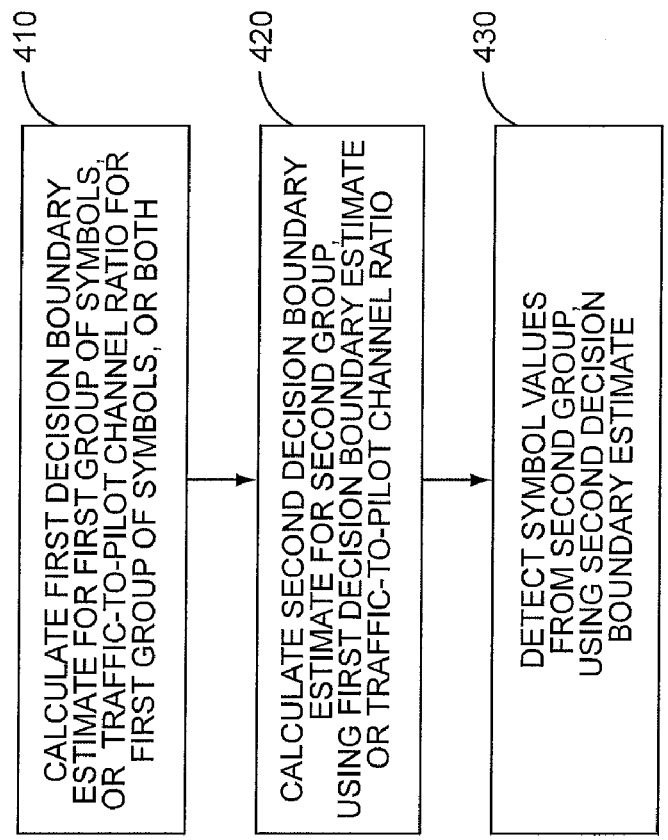
FIG. 4 is a process flow diagram illustrating an exemplary method for detecting symbols from a received signal.

With the above receiver techniques for estimating a decision boundary in mind, those skilled in the art will appreciate that FIG. 4 illustrates an exemplary method for detecting symbol values from a received signal, based on an estimated decision boundary obtained according to any of the approaches described above. The method illustrated in FIG. 4 may be implemented in the wireless receiver of FIG. 2, as discussed above, or other wireless receivers.

The method illustrated in FIG. 4 begins with the calculation of a first decision boundary estimate or a first estimate of a traffic-to-pilot channel scaling ratio, or both, for a first group of combined symbols. This is shown at block 410. As shown above in exemplary Equations (14) and (15), these calculations may be based on amplitudes or power levels of the combined symbols of the first group, and may further incorporate rank-one updated channel weights corresponding to the first group of symbols (i.e., channel weights accounting for code-reuse interference from a second stream).

As shown at block 420, a second decision boundary estimate, corresponding to a second group of combined symbols, is calculated. This computation is based on channel estimates corresponding to the second group and is based on the first decision boundary estimate or the first estimate of the traffic-to-pilot channel scaling ratio, and does not depend on either amplitudes or power levels of the combined symbols of the second group. Examples of this calculation are shown above at Equations (17), (18), and (19). The estimated decision boundary for the second group of symbols is then used to detect a symbol value for each combined symbol of the second group, as shown at block 430.

Figure 5:
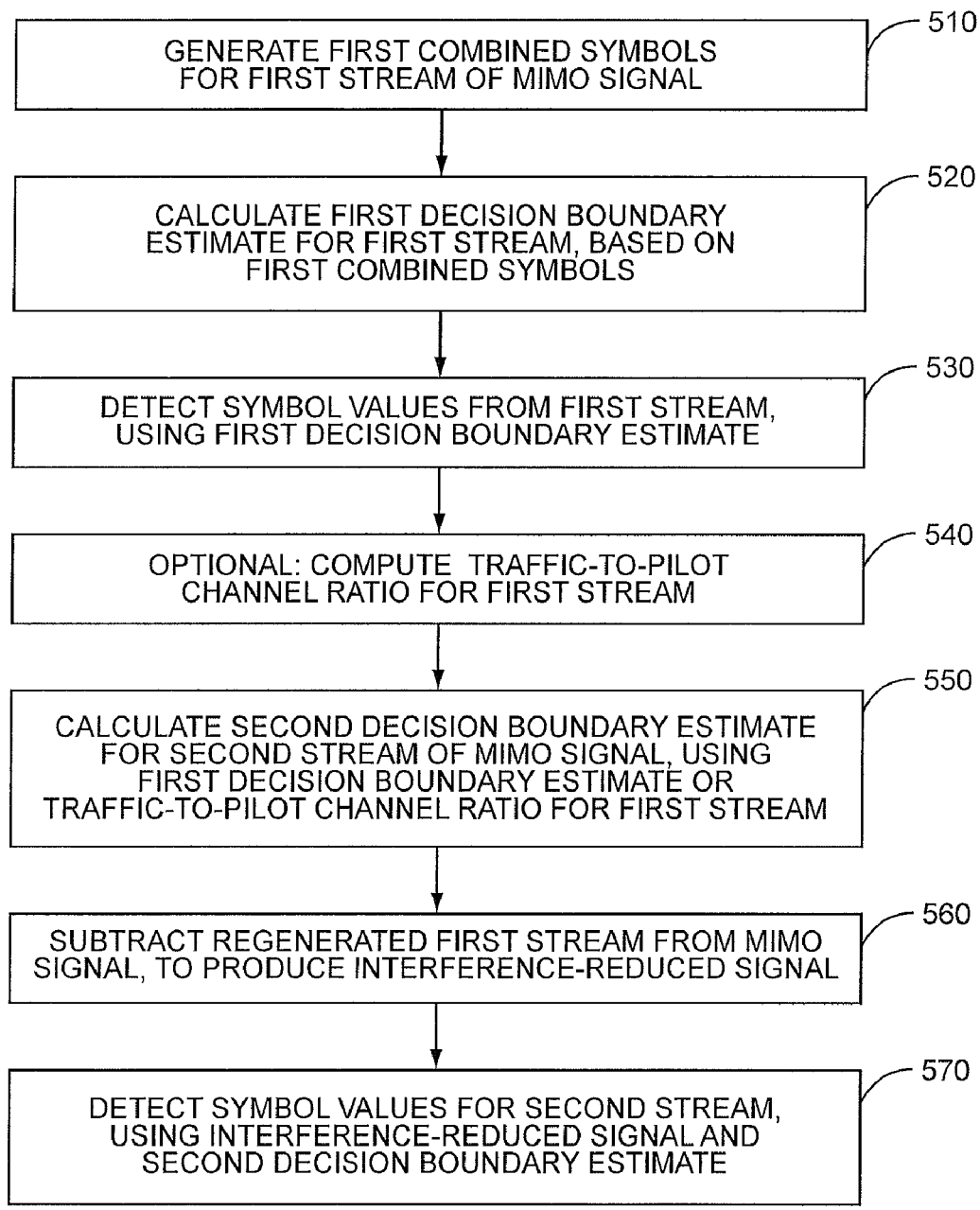
FIG. 5 is a process flow diagram illustrating an exemplary method for detecting symbols from a received MIMO signal, using a successive interference cancellation process.

The process flow diagram of FIG. 5 provides additional details of a method for detecting symbol values from a spatially multiplexed signal. Thus, this process flow diagram represents a special case of the process illustrated in FIG. 4, corresponding to a scenario in which the first group of combined symbols discussed above is received from a first stream of a spatially multiplexed signal and the second group of combined symbols is received from a simultaneously transmitted second stream of the spatially multiplexed signal.

The process illustrated in FIG. 5 thus begins with the generation of first combined symbols for the first stream of the spatially multiplexed MIMO signal, as shown at block 510. For instance, the symbols for a given slot may be formed using rank-one updated combining weights, as discussed above in connection with Equations (8) and (9). Next, as illustrated at block 520, these first combined symbols are used to calculate a first decision boundary estimate, corresponding to the first stream. In some embodiments, this is done by simply averaging the amplitudes of the first group of combined symbols. The resulting first decision boundary estimate is then used to detect symbol values from the first stream, as shown at block 530.

Once the first decision boundary estimate has been obtained, a second decision boundary estimate, corresponding to the symbols of the second stream, may be computed. In some cases, the second decision boundary estimate may be computed directly from the first decision boundary estimate, such as according to Equation (18). In other embodiments, a traffic-to-pilot channel scaling ratio for the first stream is first computed, as shown at block 540. Thus, as shown at block 550, the second decision boundary estimate for the second stream of the MIMO signal may be computed as a function of the first decision boundary estimate or based on the traffic-to-pilot channel scaling ratio for the first stream. In both cases, the combined symbol values for the second data stream are not needed to obtain the second decision boundary estimate.

The second decision boundary estimate may then be used to demodulate the second data stream. In a SIC receiver, such as was illustrated in FIG. 2, an interference-reduced signal is first obtained by subtracting regenerated symbols for the first stream from the received signal, thus removing effects of code-reuse interference, as shown at block 560. Then, the second decision boundary estimate is applied to the interference-reduced signal, as shown at block 570, to de-map the received symbols according to the modulation scheme used, and to obtain soft bits for subsequent decoding.

Those skilled in the art will appreciate that the above-described procedures can be modified in a number of ways. For instance, the estimation of the traffic-to-pilot channel scaling ratio shown in Equation (15) is based only upon data for symbols of the first group. In some embodiments, the first estimate of the traffic-to-pilot channel scaling ratio may be calculated based further on filtered prior estimates for the traffic-to-pilot channel scaling ratio. Other variations of the specific calculations described above will be evident to those skilled in the art, including various techniques for filtering and/or updating $\alpha_{pc}$ that are described in the several patent applications identified above and incorporated by reference herein.

Those skilled in the art will further appreciate that the receivers and methods described above may also be modified to address a problem that is not unique to spatially multiplexed signals—the problem of noisy decision boundary estimates. Under some circumstances, a decision boundary estimate for a small set of combined symbols (i.e., resulting from the use of a few channelization codes and/or a shorter period than one slot) is sought. Using only the combined symbols of the set itself for estimation of the decision boundary gives a noisy estimate. If it can be assumed that an updated value of $\alpha_{pc}$ is available (see, for example, U.S. patent application Ser. No. 12/391,796), a "small-group decision boundary estimate", $d_i$, for the small group, i, may be computed using:

$$d_i = \frac{|Re(W_i^H H_i)| + |Im(W_i^H H_i)|}{2m_i} \sqrt{\alpha_{pc}}, \qquad (20)$$

where $W_i$ are the combining weights used for the small set, $H_i$ is the estimated (pilot) channel vector for the small set and $m_i$ is a factor depending on the modulation used in the small set (as discussed above). A typical application may be a receiver traveling on a high speed train, such that time-varying fading is severe.

Although the small sets of symbols may not (due to noise) be able to give immediate estimates of the decision boundary (using existing methods) that are useful, such immediate estimates may be recalculated to generate corresponding "small-group" values of $\alpha_{PC}$ using:

$$\alpha_{pci} = \left( m_i \cdot \frac{2d_i}{|Re(W_i^H H_i)| + |Im(W_i^H H_i)|} \right)^2, \qquad (21)$$

and filtered over successive observations, thereby contributing to an updated value of $\alpha_{pc}$. This updated value of $\alpha_{pc}$ may then be used to calculate decision boundary estimates for subsequent groups of symbols.

Finally, those skilled in the art will appreciate that in some embodiments of the invention, a decision boundary computed according to any of the techniques above may be combined with a decision boundary computed according to known methods to yield an improved decision boundary estimate. The combination may be, for example, a weighted average of the different sources, where the weights depend on the variance of the sources (linear combination giving minimum variance).

Those skilled in the art will appreciate that a particular technique may be selected and/or adapted from the above-described techniques according to the demands of a particular system or application, and/or according to design constraints imposed by the wireless receiver structure or design. Those skilled in the art will further appreciate that two or more of the above detailed techniques or variants thereof may be combined, in some embodiments. For example, the techniques illustrated in FIG. 5 may be applied when a given receiver is operating in a MIMO mode, with a different approach (including, for example, the small-group approach described above) applied during single-stream mode.

Indeed, given the above variations and examples in mind, those skilled in the art will appreciate that the preceding descriptions of various embodiments of methods and apparatus for processing a received multi-stream MIMO signal are given only for purposes of illustration and example. As suggested above, one or more of the specific processes discussed above, including the process flows illustrated in FIGS. 4 and 5, may be carried out in a wireless receiver comprising one or more appropriately configured processing circuits, which may in some embodiments be embodied in one or more application-specific integrated circuits (ASICs). In some embodiments, these processing circuits may comprise one or more microprocessors, microcontrollers, and/or digital signal processors programmed with appropriate software and/or firmware to carry out one or more of the processes described above, or variants thereof. In some embodiments, these processing circuits may comprise customized hardware to carry out one or more of the functions described above. Other embodiments of the invention may include computer-readable devices, such as a programmable flash memory, an optical or magnetic data storage device, or the like, encoded with computer program instructions which, when executed by an appropriate processing device, cause the processing device to carry out one or more of the techniques described herein for estimating receiver frequency offset in a communications receiver. Those skilled in the art will recognize, of course, that the present invention may be carried out in other ways than those specifically set forth herein without departing from essential characteristics of the invention. The present embodiments are thus to be considered in all respects as illustrative and not restrictive, and all changes coming within the meaning and equivalency range of the appended claims are intended to be embraced therein.

What is claimed is:

1. A wireless receiver for detecting symbol values from a received signal, the wireless receiver comprising a signal processing circuit configured to:

calculate a first decision boundary estimate or a first estimate of a traffic-to-pilot channel scaling ratio, or both, for a first group of combined symbols, based on amplitudes or power levels of the combined symbols of the first group;

calculate a second decision boundary estimate corresponding to a second group of combined symbols, based on channel estimates corresponding to the second group and based on the first decision boundary estimate or the first estimate of the traffic-to-pilot channel scaling ratio; and detect a symbol value for each combined symbol of the second group, based on the second decision boundary estimate.

2. The wireless receiver of claim 1, wherein the signal processing circuit is configured to calculate the second decision boundary estimate without using amplitudes or power levels of the combined symbols of the second group.

3. The wireless receiver of claim 1, wherein the wireless receiver comprises two or more antenna interfaces and a radio front-end circuit configured to provide received signal samples corresponding to each of the antenna interfaces, and wherein the signal processing circuit is configured to form the first group of combined symbols corresponding to a first stream of a spatially multiplexed signal and to form the second group of combined symbols from a simultaneous second stream of the spatially multiplexed signal, using the received signal samples.

4. The wireless receiver of claim 3, wherein the signal processing circuit is configured to calculate the first decision boundary estimate by averaging the amplitudes of the first group of combined symbols, and to calculate the second decision boundary estimate directly from the first decision boundary estimate.

5. The wireless receiver of claim 3, wherein the signal processing circuit is configured to:

calculate the first decision boundary estimate by averaging the amplitudes of the first group of combined symbols;

calculate the first estimate of the traffic-to-pilot channel scaling ratio based on the first decision boundary estimate and channel estimates for the first group of combined symbols; and calculate the second decision boundary estimate from the first estimate of the traffic-to-pilot channel scaling ratio.

6. The wireless receiver of claim 5, wherein the signal processing circuit is configured to calculate the first estimate of the traffic-to-pilot channel scaling ratio based further on filtered prior estimates for the traffic-to-pilot channel scaling ratio.

7. The wireless receiver of claim 3, wherein the signal processing circuit is further configured to:
detect first symbol values for the first group of combined signals;
subtract a regenerated signal based on the first symbol values from the spatially multiplexed signal, to form an interference-reduced signal; and
form the second group of combined symbols from the interference-reduced signal.

8. The wireless receiver of claim 1, wherein the signal processing circuit is further configured to calculate a small-group estimate of the traffic-to-pilot channel scaling ratio, based on the second decision boundary estimate, and to generate an updated estimate of the traffic-to-pilot channel ratio based on the small-group estimate.

9. A method in a wireless receiver for detecting symbol values from a received signal, the method comprising:
calculating a first decision boundary estimate or a first estimate of a traffic-to-pilot channel scaling ratio, or both, for a first group of combined symbols, based on amplitudes or power levels of the combined symbols of the first group;
calculating a second decision boundary estimate corresponding to a second group of combined symbols, based on channel estimates corresponding to the second group and based on the first decision boundary estimate or the first estimate of the traffic-to-pilot channel scaling ratio; and
detecting a symbol value for each combined symbol of the second group, based on the second decision boundary estimate.

10. The method of claim 9, wherein the second decision boundary estimate is calculated without using amplitudes or power levels of the combined symbols of the second group.

11. The method of claim 10, wherein the first group of combined symbols is received from a first stream of a spatially multiplexed signal and the second group of combined symbols is received from a simultaneous second stream of the spatially multiplexed signal.

12. The method of claim 11, wherein the first decision boundary estimate is calculated by averaging the amplitudes of the first group of combined symbols, and the second decision boundary estimate is calculated directly from the first decision boundary estimate.

13. The method of claim 11, wherein: the first decision boundary estimate is calculated by averaging the amplitudes of the first group of combined symbols; the first estimate of the traffic-to-pilot channel scaling ratio is calculated based on the first decision boundary estimate and channel estimates for the first group of combined symbols; and the second decision boundary estimate is calculated from the first estimate of the traffic-to-pilot channel scaling ratio.

14. The method of claim 13, wherein the first estimate of the traffic-to-pilot channel scaling ratio is calculated based further on filtered prior estimates for the traffic-to-pilot channel scaling ratio.

15. The method of claim 11, further comprising:
detecting first symbol values for the first group of combined signals;
subtracting a regenerated signal based on the first symbol values from the spatially multiplexed signal, to form an interference-reduced signal; and
forming the second group of combined symbols from the interference-reduced signal.

16. The method of claim 10, further comprising calculating a small-group estimate of the traffic-to-pilot channel scaling ratio, based on the second decision boundary estimate, and generating an updated estimate of the traffic-to-pilot channel ratio based on the small-group estimate.

* * * * *

UNITED STATES PATENT AND TRADEMARK OFFICE
CERTIFICATE OF CORRECTION

PATENT NO.         : 8,385,477 B2
APPLICATION NO.    : 12/645555
DATED              : February 26, 2013
INVENTOR(S)        : Cedergren et al.

It is certified that error appears in the above-identified patent and that said Letters Patent is hereby corrected as shown below:

On the Title Page, Item (56), under "OTHER PUBLICATIONS", in Column 2, Line 9, delete "Prlject." and insert -- Project, --, therefor.

On the Title Page, Item (57), under "ABSTRACT", in Column 2, Line 3, delete "a" and insert -- an --, therefor.

In the Specifications:

In Column 2, Line 40, delete "on a" and insert -- on an --, therefor.

In Column 6, Line 38, delete "and." and insert -- and --, therefor.

In Column 6, Line 40, delete "herein." and insert -- herein, --, therefor.

In Column 9, Line 40, delete "rank-1update" and insert -- rank-1 update --, therefor.

In Column 10, Line 39, delete "HS-PDSH" and insert -- HS-PDSCH --, therefor.

In Column 10, Line 53, delete "$m=\sqrt{21/16}.$" and insert -- $m = \sqrt{21/16})$. --, therefor.

Signed and Sealed this
Eighteenth Day of June, 2013

Teresa Stanek Rea
*Acting Director of the United States Patent and Trademark Office*